United States Patent [19]

Amer

[11] Patent Number: 4,959,227

[45] Date of Patent: Sep. 25, 1990

[54] HIGH DIETARY FIBER LOW LACTOSE LIQUID FOOD AND A METHOD OF PRODUCING SAME

[76] Inventor: Moh. S. Amer, 3177 Padaro La., Carpenteria, Calif. 93013

[21] Appl. No.: 15,303

[22] Filed: Feb. 17, 1987

[51] Int. Cl.$^5$ .................................................. A23C 9/12
[52] U.S. Cl. ..................................... 426/35; 426/564; 426/565; 426/587
[58] Field of Search ............... 426/578, 580, 565, 804, 426/61, 587, 588, 565, 35

[56] References Cited

U.S. PATENT DOCUMENTS 3,993,793  11/1976  Finney .................................. 426/565
4,333,953  6/1982  Trzecieski ........................... 426/565
4,333,954  6/1982  Trzecieski ........................... 426/565
4,374,861  2/1983  Trzecieski ............................. 426/42

*Primary Examiner*—Carolyn Paden
*Attorney, Agent, or Firm*—Samson B. Leavitt; Michael A. Leavitt

[57] ABSTRACT

A food product, and especially a packaged meal, prepared from an aqueous composition comprising non-fat milk solids, preferably little or not fat, at least about 2 grams of dietary fiber material in an average serving amount of the food product, and lactase enzyme in an amount sufficient to hydrolyze at least about 75% of the lactose in the composition to glucose and galactose in the food product; and a method of preparing same.

7 Claims, No Drawings

HIGH DIETARY FIBER LOW LACTOSE LIQUID FOOD AND A METHOD OF PRODUCING SAME

BACKGROUND OF THE INVENTION

This invention relates to an improved food product and especially to a low or non-lactose food product containing a significant amount of dietary fiber, for animal, e.g. human consumption. The invention is especially concerned with a balanced liquid meal which may be used to replace an ordinary meal or in a dietary regimen, although the invention has broader aspects as will be further described below. The liquid meal is designed to provide necessary dietary requirements for people who wish to maintain their health and physical fitness while ingesting natural ingredients providing such dietary requirements.

Many different types of liquid meal have been previously proposed as replacements for conventional meals, but non have been entirely satisfactory for all uses and consumers, and most have been subject to various deficiencies and disadvantages such as unacceptable storage stability and taste, inclusion of materials usually considered objectionable such as fats and other high calorie materials, and omission of materials usually considered desirable or necessary such as calcium and dietary fiber. Milk, skim milk and non-fat milk solids (MSNF) are excellent natural sources of calcium, protein and other desirable food components, but the lactose in the milk solids cannot be tolerated by many people, is insufficiently water-soluble whereby it tends to crystallize in storage at higher concentrations and/or low temperatures, and does not provide as much sweetness as desired. Fats are regarded as providing undesired calorie intake and increased cholesterol blood levels. Dietary fiber is regarded as desirable in promoting resistance to irregularity, constipation, intestinal disfunctions, colon cancer, and even heart disease.

SUMMARY OF THE INVENTION

It is an object of this invention to provide a food product ready-to-ingest, balanced liquid meal which will not be subject to one or more of the above deficiencies and disadvantages. Another object of the invention is to provide such a food product or liquid meal which is low in or devoid of fat, has a basis of non-fat milk solids, but is low in or devoid of lactose, is low in calories per serving, has a desirable sweet taste and content of dietary fiber, is stable with respect to suspension, taste and other properties required for storage and human consumption, and/or is made from natural materials. Still another object of the invention is to provide a process for making such a food product or liquid meal.

In accordance with certain of its aspects this invention relates to a liquid meal prepared from a composition comprising skim milk, lactose, non-fat milk solids, dietary fiber material and lactase enzyme, said enzyme being added to said liquid meal in an amount which hydrolyzes at least about 75 wt. % up to about 95 wt, % or more, typically about 80 to about 85 wt. % of said lactose to glucose and galactose, preferably in a reasonably prompt period of time, e.g. from about 1 to about 5 hours, but which may range up to about 48 hours or more, depending upon such factors as temperature, concentration, pH, etc.

It is, of course, textbook chemistry that lactose is hydrolyzed to glucose and galactose by lactase. This reaction is, for instance, disclosed in U.S. Pat. Nos. 4,091,116 to Edwards et al; 4,007,283 to Crisan et al; 2,681,858 to Stimpson; 4,374,861 to Traecieski; 4,364,962 to Tuchenhagen et al; and 4,327,179 to Moesbus et al.

In U.S. Pat. No. 4,497,800 to Larsen et al, there is described a liquid meal formulated for undernourished patients. However, neither lactose nor sufficient dietary fiber are employed in the liquid meal of this patent.

In above mentioned U.S. Pat. No. 4,374,861 to Traecieski an ice cream composition is described containing skimmed milk powder, lactose and lactase preparation, but these compositions contain substantial amounts of edible fats and saccharose and an insufficient amount of dietary fiber.

The liquid character of the meal replacement product of the present invention is due primarily to its liquid skim milk content which typically comprises about 75–90% by weight of the total composition. The meal character of the product is supplemented by addition of about 3–15% lactose and about 2–10% milk solid non-fat materials (MSNF), containing lactose, casein, globulin and albumin by weight of the composition. Generally about 50–60% by weight of the MSNF and about 4.8% by weight of the skim milk is lactose which, with the lactose supplement, is enzymatically hydrolyzed in situ as described above to provide the natural sweetener materials glucose and galactose in approximately equimolar proportions. Hydrolysis of one mole of lactose yields one mole of glucose and one mole of galactose, a sweetener mixture which is 80% as sweet as sucrose, in contrast to lactose which is only about 20% as sweet as sucrose. The initial composition generally contains about 10 to about 25 wt. % of lactose. Due to this increased sweetness, smaller quantities of the usual sugars or even artifical sweeteners are needed. The liquid meal is also of course thus made acceptable of lactose-sensitive consumers.

The liquid meal may be flavored with any flavor enjoyed by consumers. For example, excellent readily available natural flavors are chocolate, cocoa, vanilla, orange, lemon, lime, lemon-lime, strawberry, blueberry, raspberry and the like. The flavor content in the liquid meal may vary but is generally about 0.01–1% by weight.

The presence of significant amounts of dietary fiber material is an essential feature of this invention for providing the above described health benefits. Such amounts require a minimum of about two grams of the fiber in an average serving of the meal or food product. An average ca. half pint serving of the instant meal, for example, generally should contain about 0.5 to about 7, preferably about 0.8 to about 5, more preferably about 1 to about 4 wt. % of the fiber material.

Desirable water-insoluble types are natural cereal, fruit, grain and cellulose fiber materials such as methyl cellulose, hydroxyethylcellulose, hydroxypropyl cellulose, crystalline cellulose and preferably carboxymethyl cellulose.

Soluble types of dietary fiber are preferred for reducing calorie intake since (1) they bind bile acids which break down fat, thereby preventing the fat from being absorbed through the gut, and (2) they bind water in the gut, thereby yielding a more viscous mass which is not as readily absorbed through the gut. Examples of such water-soluble types are generally plant gums and plant gum derivatives such as locust bean gum, citrus pectin, low and high methoxy pectin, gum tragacanth, agar, carrageenan, xanthin gum, guar gum, alginate, and preferably gum arabic and the like.

The dietary fiber material also serves as a suspending or stabilizing agent whereby other usual such agents can be eliminated or reduced in amount.

Broadly considered, the process for preparing the liquid meal herein comprises pasteurizing and cooling a composition containing skim milk, non-fat milk solids, and lactose, and A. adding to the composition before, between or after said pasteurizing and cooling steps at least about 2 grams of dietary fiber material per average serving amount of said meal, and B. before said pasteurizing step or after said cooling step also adding to the composition an amount of lactase enzyme sufficient to hydrolyze at least about 75 wt. % of the lactose in the composition to glucose and galactose and holding the enzyme-containing composition for a time and under conditions enabling such degree of hydrolysis to occur.

The pasteurization is carried out in known manner, being often referred to as HTST (high temperature, short time) and generally involving heating the composition at about 162 to about 190° F. for about 15 to about 30 seconds, combined with homogenization, also in known manner. Preferably the fiber material is blended with the skim milk, MSNF and lactose (and flavor) before pasteurization, but it may be added at any stage of the process, including before or after an optional final heat treatment often referred to as UHT (ultra high temperature) involving treatment of the composition (after pasteurization, cooling, etc.) at about 275°–300° F. for about 5 to 10 seconds to kill any organisms which might have meanwhile entered the composition.

The cooling step after pasteurization is typically down to about 80° to 120° F., preferably about 97° to 110° F., more preferably about 100° F., at which point the lactase may be added, generally through a sterile filter and in proportions of about 0.02 to about 5 wt. % by weight of the lactose in the composition, the desired hydrolysis or conversion of the lactose being usually completed at said temperature and about 6–7 pH in about 2 to about 4 hours. The lactase may however to be added at other times during the process, so long as the lactase enzyme-containing composition is then held for a time and under conditions enabling the desired degree of hydrolysis to occur. This, of course, requires avoidance of high (e.g. pasteurization) temperatures, and/or acid conditions (i.e. pH of 5 or less) which inactivate or destroy the enzyme. The duration of the hydrolysis is dependent on amounts involved, activity of the enzyme, and temperature. For example, the hydrolysis could occur even under refrigerated conditions of as low as 40° F. or less, but could require a week or more. Plant practice often includes addition of the lactase as a last step before packaging and storing the package at ambient temperatures (65° to 95° F.) for a couple of days during which the desired hydrolysis is completed in the package.

The source of lactase may vary although it is most preferred that it be of high purity and substantially free of protease, zymase and amylase impurities as well as of other natural enzymes, heavy metals, bacteria, yeast and mold. Maxilact L-2000 (2000 Lactase Activity Units/ml) and Lactozym 1500L (1500 LAU/ml) are typical of the many lactase preparations which may be used. Lactase prepared in accordance with U.S. Pat. No. 4,007,283 to Crisan et al is suitable for use in the present invention. Highly preferred for use herein is Pfizer's "Neutral Lactase" solution having an activity of 2,750 ONPG Units/ml. each unit hydrolyzing 1 micromol of o-nitrophenylbetagalactose pyranoside to o-nitrophenol in 1 minute at 37° C. and 6.6 pH.

The liquid meal composition is exceedingly shelf-stable, particularly when packaged in a laminate container such as described in any of U.S. Pat. Nos. 4,267,957 to Holmstorm and 4,294,362 to Martinsson or including the laminate package wall of U.S. Pat. No. 4,387,247 to Rell et al. A package containing about 8 fluid ounces of the liquid meal of the invention serves very well as a meal replacement.

DESCRIPTION OF THE PREFERRED EMBODIMENTS

The above description concerning the preparation of a complete liquid meal according to the invention is applicable also to other food products such as ice cream, yogurt, cottage cheese, buttermilk, milk shakes, soft serve, ice milk, sherbert and the like and prepared from an aqueous composition comprising non-fat milk solids, at least about 2 grams of dietary fiber material in an average serving amount of the food product, and lactase enzyme in an amount sufficient to hydrolyze at least about 75 wt. % of the lactose in the composition to glucose and galactose in the food product. In each instance the above-described proportions of dietary fiber material and lactase enzyme are added to the conventional formulations in the manner and under the conditions described above. More particularly, and similarly to the liquid meal, the invention includes a process for preparing such a food product comprising pasteurizing and cooling an aqueous composition containing non-fat milk solids, and A. adding to the composition before, between, or after said pasteurizing and cooling steps at least about 2 grams of dietary fiber material per average serving amount of said food product, and B. before said pasteurizing step or after said cooling step also adding to the composition an amount of lactase enzyme sufficient to hydrolyze at least about 75 wt. % of the lactose in the composition to glucose and galactose and holding the enzyme-containing composition for a time and under the conditions enabling such degree of hydrolysis to occur.

The following examples are only illustrative of the invention and are not limitative. All amounts and proportions referred to herein and in the appended claims are by weight and temperatures are in ° F. unless otherwise indicated.

EXAMPLE 1

Low Fat Chocolate Meal

The following ingredients are blended in a tank with a power blendor:

| | |
|---|---|
| Skim milk | 862 |
| MSNF | 25 |
| Lactose | 75 |
| Powdered chocolate blend containing Dutch cocoa and 14.5 parts carboxymethyl cellulose fiber | 18 |
| Vanilla flavor | 0.22 |
| Carrageenan | 0.18 |

Agitation is maintained with reduced foaming and MTST pasteurization is effected at 175° F. for 16 seconds and passing through a two stage homogenizer with the first stage valve setting at 1500 psig and the second stage valve setting at 500 psig (total 2000 psig).

The pasteurized surge is then cooled to about 105° F., 0.2 part of Pfizer "Neutral Lactase" (2750 ONPG Units/ml.) are blended in, and the mixture is agitated at 100°–105° F. for about 3 hours to effect the in situ lactose conversion.

The mixture is then subjected to UHT treatment at 282° F. for 7.8 seconds with homogenization at 1500 psig, cooled and packaged in the parallelopiped packing containers of U.S. Pat. No. 4,292,362 to Martinsson. 8.45 fl. oz. of the product constitutes a nutritionally desirable meal replacement serving having the following characteristics:

| Calories | 160 |  |
|---|---|---|
| Protein | 12 | grams |
| Carbohydrate | 29 | grams |
| Fat | less than 1 | gram |
| Sodium | 170 | milligrams |
| Dietary fiber | 4 | grams |
| pH | 4–4.5 | |
| % of U.S. Recommended Daily Allowance (RDA) | | |
| Protein | 25 | |
| Vitamin A* | 10 | |
| Vitamin C | less than 2 | |
| Thiamine | 8 | |
| Riboflavin | 25 | |
| Niacin | less than 2 | |
| Calcium | 40 | |
| Iron | 2 | |
| Vitamin D* | 5 | |
| Vitamin $B_6$ | 4 | |
| Vitamin $B_{12}$ | 20 | |
| Phosphorus | 30 | |
| Magnesium | 10 | |
| Zinc | 8 | |
| Pantothenic Acid | 10 | |

*Forified as required for low fat milk

EXAMPLE 2

Low Fat Strawberry Meal

The following ingredients are blended in a tank with a power blendor and processed as in Example 1:

| Skim milk | 864 |
|---|---|
| MSNF | 25 |
| Lactose | 65 |
| Gum Arabic dietary fiber | 11 |
| Strawberry flavor | 0.4 |

The product has characteristics substantially similar to those disclosed in Example 1.

| Low Fat Milk Shake | |
|---|---|
| | Parts |
| Vegetable oil | 1.01 |
| Emulsifier (Eastman Mivatex) | 0.05 |
| Stabilizer* | 0.41 |
| Gum Arabic dietary fiber | 0.81 |
| MSNF | 3.66 |
| Calcuim phosphate | 0.16 |
| Vitamin A** | 25% RDA |
| Vitamin D** | 25% RDA |
| MFCS*** 42% | 14.28 |
| Flavored Syrup | 8.11 |
| Skim milk | 71.51 |

*contains 8% carrageenan (Iodoform), 20% guar gum, 5.5% carboxymethyl cellulose, 11.1% glyceryl monostearate, and 55.4% dextrose.
**Fortified as required for low fat milk
***High Fructose Corn Syrup The above food product formulation is prepared for final consumption in known conventional manner involving an MTST pasteurization, but immediately following the pasteurization the pasteurized surge is cooled to 100°–105° F. and, after addition of about 1.5% of the aforesaid Neutral Lactase enzyme preparation by weight of the lactose in the formulation (MSNG, skim milk), maintained at such temperature for about 2–3 hours to effect the desired in situ conversion of the lactose to glucose and galactose.

The same procedure is employed in preparing the food product formulation of the following example.

EXAMPLE 4

| Low Fat Shake Base | |
|---|---|
| | Parts |
| MSNF | 3.59 |
| Microcrystalline cellulose dietary fiber | 0.87 |
| Stabilizer* | 0.19 |
| Tricalcium phosphate | 0.12 |
| Modified food starch | 0.24 |
| Partially hydrogenated coconut oil** | 1.00 |
| Skim milk | 83.29 |
| 36 DE corn syrup (81% solids) | 3.42 |
| Sugar | 7.28 |

*Contains 60.0% mono- & diglycerides, 12.5% carboxymethyl cellulose, 12.5% guar gum, 8.77% locust beam gum, 6.14% carrageenan
**any 92–110° melt partially hydrogenated vegetable oil could be used

What is claimed is:

1. A liquid ready-to-ingest non-fat or low fat food product prepared from a composition comprising, approximately by weight, 71.5 to 89.5% of skim milk, 2 to 10% of non-fat milk solids, 0.5 to 7% of dietary fiber material, no more than 1% of fat, and lactase enzyme within the range of 0.02 to 5% by weight of the lactose in the composition sufficient to hydrolyze at least 75% of such lactose to glucose and galactose.

2. The liquid food product of claim 1 containing about 1 to about 4 wt. % of dietary fiber material.

3. The liquid food product of claim 1 wherein said dietary fiber material is selected from the group consisting of gum arabic, locust bean gum, citrus pectin, low and high methoxy pectin, gum tragacanth, agar, carrageenan, xanthin gum, guar gum and alginate.

4. The liquid food product of claim 1 wherein said dietary fiber material is selected from the group consisting of carboxymethyl cellulose, crystalline cellulose, methyl cellulose, hydroxethyl cellulose, hydroxpropyl cellulose, cereal, grain and fruit fiber.

5. A process for preparing a liquid food product as defined in claim 1 comprising pasteurizing and cooling a composition containing said skim milk and non-fat milk solids, and
   A. adding to the composition before, between or after said pasteurizing and cooling steps said of dietary fiber material, and
   B. before said pasteurizing step or after said cooling step also adding to the composition said lactase enzyme and holding the enzyme-containing composition for a time and under conditions enabling such degree of hydrolysis to occur.

6. A process according to claim 5 wherein step B comprises adding to the composition after said cooling step said lactase enzyme.

7. A process according to claim 5 wherein step A comprises adding about 1 to about 4 wt. % of the dietary fiber material to the composition.

* * * * *